(12) United States Patent
Atkins

(10) Patent No.: US 7,656,543 B2
(45) Date of Patent: Feb. 2, 2010

(54) ALBUMING IMAGES

(75) Inventor: Clayton Brian Atkins, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1013 days.

(21) Appl. No.: 10/987,288

(22) Filed: Nov. 12, 2004

(65) Prior Publication Data

US 2006/0103891 A1 May 18, 2006

(51) Int. Cl.
G06F 15/00 (2006.01)
G06K 1/00 (2006.01)
(52) U.S. Cl. .................. 358/1.13; 358/1.15; 358/1.18; 358/450; 382/112; 382/284
(58) Field of Classification Search ....... 358/1.15–1.18; 715/205, 202, 247, 760; 345/629, 716, 835; 382/112, 284, 295; 707/104.1, 200
See application file for complete search history.

(56) References Cited

U.S. PATENT DOCUMENTS

| 5,136,686 | A | 8/1992 | Koza |
| 5,499,366 | A | 3/1996 | Rosenberg et al. |
| 5,555,362 | A | 9/1996 | Yamashita et al. |
| 5,712,995 | A | 1/1998 | Cohn |
| 5,729,254 | A | 3/1998 | Marks et al. |
| 5,760,786 | A | 6/1998 | Marks et al. |
| 5,920,315 | A | 7/1999 | Santos-Gomez |
| 5,956,738 | A | 9/1999 | Shirakawa |
| 6,005,560 | A | * | 12/1999 | Gill et al. ................ 715/205 |

(Continued)

FOREIGN PATENT DOCUMENTS

EP 1186992 A2 3/2002

(Continued)

OTHER PUBLICATIONS

Joe Geigel et al., "Automatic page layout using genetic algorithms for electronic albuming,"Proceedings of Electronic Imaging 2001 (Jan. 2001) available on-line at http://www.

(Continued)

*Primary Examiner*—Edward L Coles
*Assistant Examiner*—Satwant K Singh

(57) ABSTRACT

Methods, machines, systems, and machine-readable media for albuming images are described. In one aspect, a first partition of a page corresponding to a first layout of a first set of images on the page is selected from a first set of candidate page partitions. Each candidate page partition corresponds to a respective layout of the first set of images on the page. In response to a user command to modify the first layout, a second partition of the page is selected. The second partition corresponds to a second layout of a second set of images on the page. In another aspect, a first layout of a first set of images is presented on a page and, in response to a user command to modify the first layout, an area in the presentation of the first layout where an image is insertable is indicated. In another aspect, a first layout of a first set of images is presented on a page and, in response to a user command to modify the first layout, sizes and positions of images in the presentation of the first layout are changed.

42 Claims, 10 Drawing Sheets

U.S. PATENT DOCUMENTS

| | | | |
|---|---|---|---|
| 6,008,809 A | | 12/1999 | Brooks |
| 6,081,262 A | * | 6/2000 | Gill et al. .................... 715/202 |
| 6,111,586 A | * | 8/2000 | Ikeda et al. ................. 345/619 |
| 6,121,970 A | * | 9/2000 | Guedalia .................... 715/760 |
| 6,301,586 B1 | * | 10/2001 | Yang et al. ............... 707/104.1 |
| 6,380,954 B1 | | 4/2002 | Gunther |
| 6,415,306 B2 | | 7/2002 | Seaman |
| 6,448,956 B1 | | 9/2002 | Berman et al. |
| 6,563,602 B1 | | 5/2003 | Uratani et al. |
| 6,596,032 B2 | * | 7/2003 | Nojima et al. ............... 715/247 |
| 6,636,648 B2 | * | 10/2003 | Loui et al. ................... 382/284 |
| 6,636,650 B1 | | 10/2003 | Long et al. |
| 6,701,306 B1 | | 3/2004 | Kronmiller et al. |
| 6,727,909 B1 | * | 4/2004 | Matsumura et al. ......... 345/629 |
| 6,771,292 B2 | | 8/2004 | Sharp |
| 6,771,801 B1 | * | 8/2004 | Fisher et al. ................ 382/112 |
| 6,977,665 B2 | * | 12/2005 | Yokouchi .................... 345/629 |
| 7,013,432 B2 | | 3/2006 | Taylor et al. |
| 7,019,864 B2 | * | 3/2006 | Delhoune et al. .......... 358/1.18 |
| 7,093,263 B1 | | 8/2006 | Sexton et al. |
| 7,096,445 B1 | | 8/2006 | Pucci et al. |
| 7,124,360 B1 | | 10/2006 | Drenttel et al. |
| 7,145,674 B2 | * | 12/2006 | Hayes ........................ 358/1.15 |
| 7,148,990 B2 | | 12/2006 | Atkins et al. |
| 7,149,968 B1 | | 12/2006 | Ackerschewski et al. |
| 7,184,167 B1 | * | 2/2007 | Ito et al. ..................... 358/1.18 |
| 7,207,735 B2 | * | 4/2007 | Narusawa et al. ............. 400/76 |
| 7,281,199 B1 | | 10/2007 | Nicol et al. |
| 2001/0033296 A1 | | 10/2001 | Fullerton et al. |
| 2002/0051208 A1 | | 5/2002 | Venable |
| 2002/0059322 A1 | * | 5/2002 | Miyazaki et al. ............ 707/200 |
| 2002/0070982 A1 | | 6/2002 | Hill et al. |
| 2002/0122067 A1 | | 9/2002 | Geigel et al. |
| 2003/0001879 A1 | | 1/2003 | Lin et al. |
| 2005/0071781 A1 | | 3/2005 | Atkins |
| 2005/0071783 A1 | | 3/2005 | Atkins |
| 2005/0138570 A1 | | 6/2005 | Good et al. |
| 2005/0240865 A1 | | 10/2005 | Atkins et al. |
| 2006/0103667 A1 | * | 5/2006 | Amit et al. .................. 345/619 |
| 2006/0200758 A1 | | 9/2006 | Atkins |
| 2006/0279566 A1 | | 12/2006 | Atkins |
| 2008/0313533 A1 | | 12/2008 | Hoyer et al. |

FOREIGN PATENT DOCUMENTS

| | | |
|---|---|---|
| EP | 1503336 A2 | 2/2005 |
| GB | 2378340 A | 2/2003 |
| JP | 01-191270 | 1/1989 |
| JP | 09-185728 | 7/1997 |
| JP | 10-293838 | 11/1998 |
| JP | 2002-288669 | 4/2002 |
| JP | 2002-142092 | 5/2002 |
| JP | 2003-101749 | 4/2003 |
| JP | 2003-274139 | 9/2003 |
| WO | WO 98/10356 A2 | 3/1998 |
| WO | WO 01/39019 A2 | 5/2001 |
| WO | WO02/37939 A2 | 5/2002 |
| WO | WO 02/084582 | 10/2002 |

OTHER PUBLICATIONS

Eldan Goldenberg, "Automatic layout of variable-content print data," MCs Dissertation, School of Cognitive & Computing Sciences, Univeristy of Sussex, Brighton, UK (2002).

D.F. Wong et al., "A new algorithm for floorplan design," Proc. Design Automation Conference, pp. 101-107, 1986.

C. Brian Atkins, "Adaptive Photo Collection Page Layout," HP Labs, Palo Alto, CA 94304, 2004 Intl Conference, Oct. 24, 2004; <http://www.hpl.hp.com/researchlist/layout>.

Joe Geigel et al., "Using Genetic Algorithms for Album Page Layouts," Multimedia, IEEE, vol. 10, Issue: 4, pp. 16-27 (Oct.-Dec. 2003).

Andreas Girgensohn and Patrick Chiu, "Stained Glass Photo Collages," UIST '04, Oct. 24-27, 2004, Santa Fe, New Mexico, USA.

\* cited by examiner

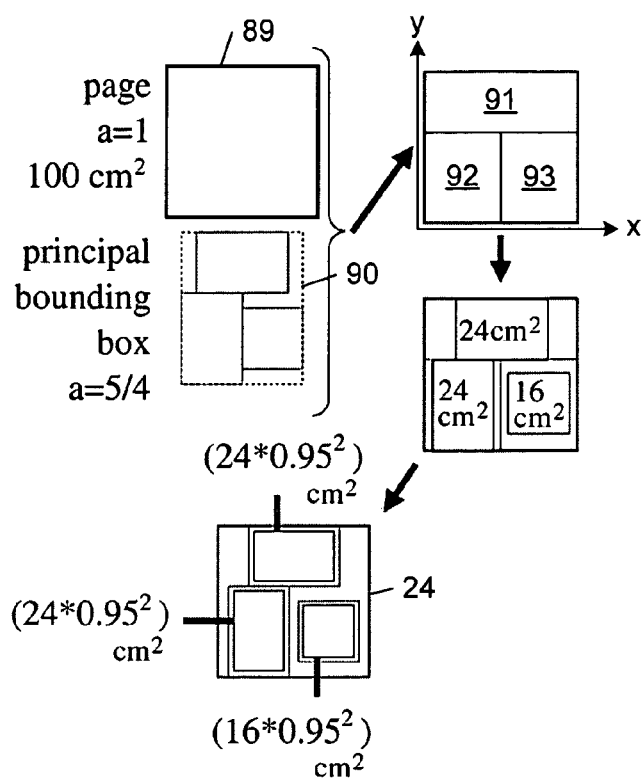
FIG. 7
FIG. 8A
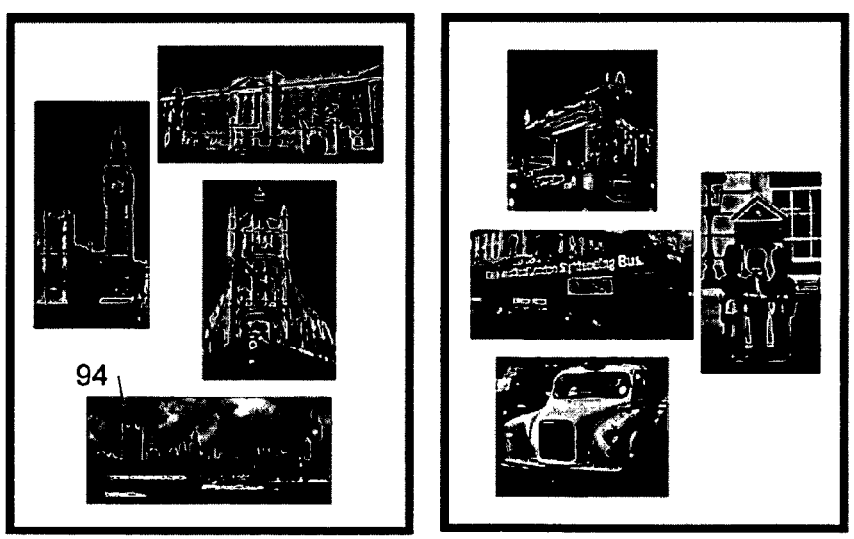
FIG. 8B

ALBUMING IMAGES

CROSS-REFERENCE TO RELATED APPLICATIONS

This application relates to the following co-pending applications, each of which is incorporated herein by reference: U.S. patent application Ser. No. 10/675,724, filed Sep. 30, 2004, by C. Brian Atkins and entitled "Automatic Photo Album Layout"; and U.S. patent application Ser. No. 10/675,823, filed Sep. 30, 2004, by C. Brian Atkins and entitled "Single Pass Automatic Photo Album Layout".

BACKGROUND

Individuals and organizations are rapidly accumulating large collections of digital image content, including still images, text, graphics, animated graphics, and full-motion video images. This content may be presented individually or combined in a wide variety of different forms, including documents, presentations, still photographs, commercial videos, home movies, and meta data describing one or more associated digital content files. As these collections grow in number and diversity, individuals and organizations increasingly will require systems and methods for organizing and presenting the digital content in their collections. To meet this need, a variety of different systems and methods for organizing and presenting digital image content have been proposed.

For example, there are several manual digital image albuming systems that enable users to create digital photo albums manually. These systems typically provide tools for organizing a collection of images and laying out these images on one or more pages. Among the common types of tools for manually creating a digital photo album are tools for selecting a subset of images in the collection that will appear on a page of an album, a graphical user interface for manually rearranging the images on the page, and basic image editing tools for modifying various characteristics, such as size and orientation, of the images that will appear in the album. Users typically find the process of generating a digital photo album using fully manual digital image albuming systems to be tedious and time consuming.

Other digital image albuming systems provide various levels of automated image layout functionality. Many of these systems, however, tend to provide a user with too little interactive control over the final layout of images on an album page. For example, some systems only allow a user to change a set of layout parameters that are used to generate the layouts of images on the album pages. Other systems provide some interactive control over the final layout of the images, but respond to user commands in unpredictable or unintuitive ways. Some automated image albuming systems merely provide a user with a set of manual interactive controls that the user may use to alter an automatically-generated album page layout.

Some automated digital image albuming systems allow users to organize digital images into album pages in accordance with dates and times specified in the meta data associated with the images. These systems also typically allow users to annotate the images appearing in the digital photo album pages. Some automated digital image albuming systems provide various predefined layout templates that a user may select to create a digital photo album. In these systems, the user assigns images from the collection to various predefined image locations on a selected layout template, and the system automatically adjusts the size, placement, rotation, and framing of the images in accordance with parameters specified for the various predefined image locations on the selected template.

Some digital image albuming systems are designed to produce album pages automatically with minimal input from the user. One such system includes a page creator module and an image placement module. The page creator module assigns images in a collection to album pages based on a first genetic evolution algorithm. The image placement module generates genetic structures of page layouts for images that are assigned to a given page based on a second genetic evolution algorithm. These genetic structures define the locations, scales, and rotational orientations of the images that are placed on a given page. A layout evaluation module compares these layouts with certain other preferences and page requirements. When a suitable layout has been generated, the final album layout may be displayed, printed, or otherwise transferred for subsequent utilization.

Another automatic digital image albuming system includes a page layout module that presents to a user an album that is organized by event and is laid out automatically based on a set of albuming parameters. The number of images that are laid out on a page is determined by a parametric method or by an analysis of the attributes of the images. The parametric method divides a page into a set of grid squares and determines the number of images to be laid out on the page based on a set of rules for laying out images on the grid squares. In this system, the actual layout of images on a page also may be determined by matching attributes of the images, such as their sizes, to a set of templates.

Another automatic digital image albuming system automatically positions images on a page based on a force model that assumes that each image imposes a force on other images located on the same page. The force is a function of the distance separating the images. The system modifies an initial layout of images on the page by moving each image in a direction of the net force acting on the image by a distance that is a function of the net force.

SUMMARY

The invention features systems and methods of albuming images.

In one aspect, the invention features a machine-implemented method of albuming images. In accordance with this inventive method, a first partition of a page corresponding to a first layout of a first set of images on the page is selected from a first set of candidate page partitions. Each candidate page partition corresponds to a respective layout of the first set of images on the page. In response to a user command to modify the first layout, a second partition of the page is selected. The second partition corresponds to a second layout of a second set of images on the page.

The invention also features a machine, a system, and a machine-readable medium for implementing the above-described image albuming method.

In another aspect of the invention, a first layout of a first set of images is presented on a page and, in response to a user command to modify the first layout, an area in the presentation of the first layout where an image is insertable is indicated.

In another aspect of the invention, a first layout of a first set of images is presented on a page and, in response to a user command to modify the first layout, sizes and positions of images in the presentation of the first layout are changed.

DESCRIPTION OF DRAWINGS

FIG. 7 is a flow diagram of an implementation of a method of allocating space on an album page in accordance with the album page layout rendering embodiment of FIG. 5.

FIG. 8A shows an exemplary collection of images on a single page laid out in accordance with the image albuming method of FIG. 2.

FIG. 8B shows a different exemplary layout of the exemplary collection of images shown in FIG. 8A on two pages.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Overview

The image albuming embodiments described in detail below automatically generate albums of images with minimal user input. These embodiments allow users to interactively edit a particular album page layout using an intuitive graphical user interface. These embodiments respond to user edits by automatically generating a new album page layout that tracks the user edits in a controlled and predictable way, improving user satisfaction with the album generation experience.

As used herein, the term "albuming" refers to a process of organizing images and laying out images on a page. The term "page" refers to any type of discrete area in which images may be laid out, including a physical page embodied by a discrete physical medium (e.g., a piece of paper) on which a layout of images may be printed, and a virtual, digital or electronic page containing a layout of images that may be presented to a user by, for example, an electronic display device. The term "album" refers to a discrete collection of pages. The term "album page" refers to a page of an album.

Figure 1:
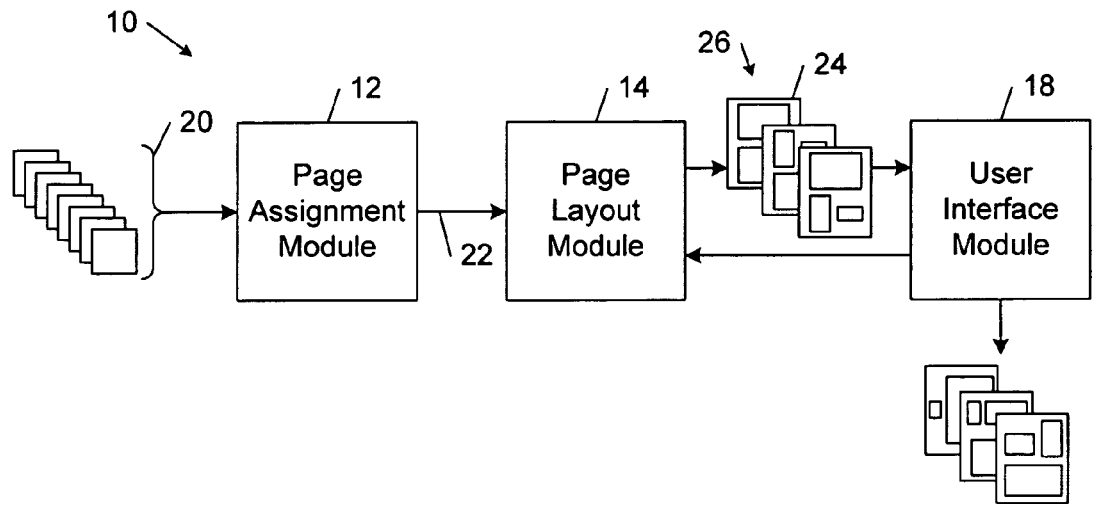
FIG. 1 is a block diagram of an embodiment of an image albuming system.

FIG. 1 shows an embodiment of an image albuming system 10 that includes a page assignment module 12, a page layout module 14, and a user interface module 18 through which a user interacts with the system 10. In general, the modules 12-18 of system 10 are not limited to any particular hardware or software configuration, but rather they may be implemented in any computing or processing environment, including in digital electronic circuitry or in computer hardware, firmware, device driver, or software. For example, in some implementations, these modules may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants).

The page assignment module 12 operates on a collection of images 20, which may be designated by the user or may be identified automatically by the image albuming system 10. The images 20 may be complete or partial versions of any type of digital or electronic image, including: an image that was captured by an image sensor (e.g., a video camera, a still image, or an optical scanner) or a processed (e.g., filtered, reformatted, enhanced or otherwise modified) version of such an image; a computer-generated bitmap or vector graphic image; a textual image; and an iconographic image.

The page assignment module 12 assigns the images 20 to one or more pages of an album using any one of a wide variety of page assignment methods. In some approaches, page assignment module 12 assigns the images 20 to pages of an album based on a page-filling criterion, such as a user-specified or default maximum number of images that may be laid out on a page, or a user-specified or default fixed number of pages in an album. In these approaches, the page assignment module 12 may assign the images 20 to pages in accordance with one or more image arrangement criteria, such as a user-specified arrangement of images or a default arrangement rule that is specified in terms of meta data associated with the images 20. For example, the page assignment module 12 may assign images 20 to pages chronologically based on date and time meta data associated with the images 20. Alternatively, the page assignment module 12 may assign images 20 to pages based on an event-based analysis of the images 20.

The page layout module 14 receives from the page assignment module 12 image assignment data 22 specifying the assignments of images to the pages 24 of an initial album 26. The page layout module 14 lays the images 20 out on each album page 24 based on the image assignment data 22 as well as hierarchical page partitions that are computed for the album pages 24. The page partitions provide explicit control over the aspect ratios and relative areas of the images 20 on the album page 24. As explained in detail below, the page layout module 14 determines a respective partition that produces an image arrangement that is suitable for the size and shape of each page. In some implementations, the page layout module 14 determines the page partitions based on a stochastic search process. In other implementations, the page layout module 14 determines the page partitions based on a deterministic search process. The page layout module 14 stores the specifications of each page layout in a respective data structure that represent a binary tree, which has leaf nodes corresponding to images and interior nodes corresponding to divisions of the corresponding page.

The images 20 may be laid out on the album pages in accordance with a "strict area" style or a "brick" style. In a strict area style layout, the relative areas of images on the same page meet specified proportions. For example, a user may specify that all images on the same page have the same area. In a brick style layout, there is no empty space between images on the same page; however, the relative areas of the images on the same page are not controlled. Additional details regarding strict area style layouts and brick style layouts may be obtained from copending U.S. patent application Ser. No. 10/675,724, filed Sep. 30, 2004, and U.S. patent application Ser. No. 10/675,823, filed Sep. 30, 2004.

The user interface 18 allows a user to interactively browse the album 26 that is generated automatically by the page layout module 14. The user interface 18 also allows a user to specify edits to the album 26. Any specified edits to a given page of the album 26 are interpreted by the user interface 18. The user interface 18 transmits the interpreted user command instructions to the page layout module 14. The page layout module 14 generates a modified tree structure for a given page of the album 26 by modifying the given tree structure in accordance with the edits received from the user interface 18 and generates a revised album based on the modified tree structure. The user interface 18 presents the revised album to the user, who may browse the revised album, specify edits to the revised album, or command the image albuming system 10 to render some or all of the pages of the revised album.

II. Generating a Layout of Images on a Page

Figure 2:
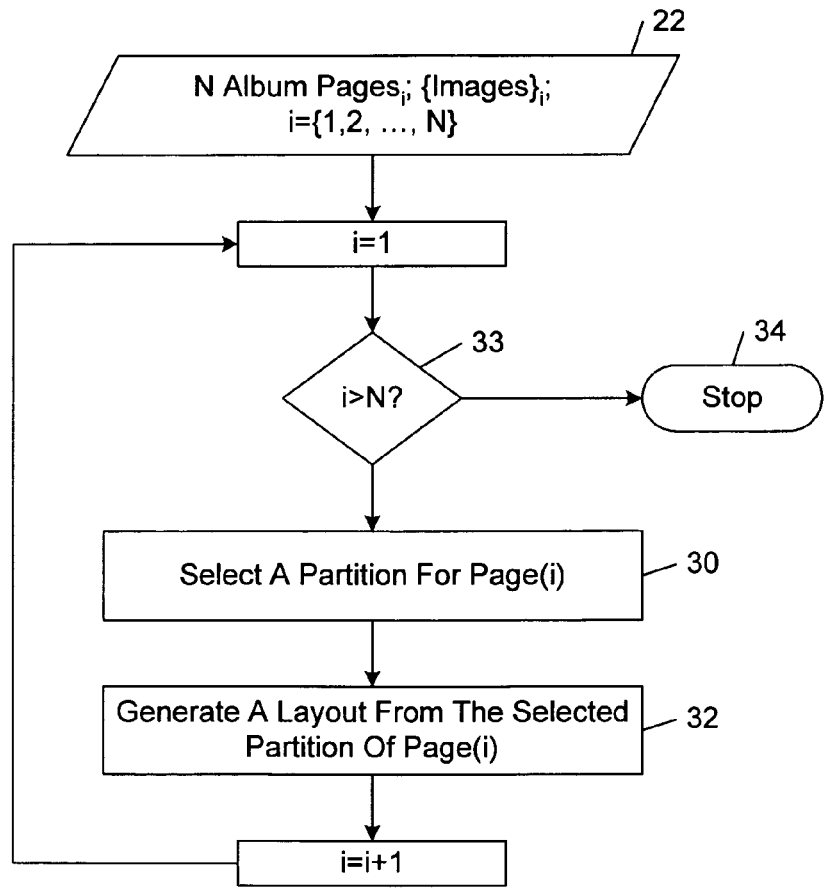
FIG. 2 is a flow diagram of an embodiment of a method of generating a layout of images on the pages of an album.

FIG. 2 shows an embodiment of a method by which the page layout module 14 generates a layout of images on a page of an album based on the image assignment data 22 received from the page assignment module 12.

In the illustrated embodiment, the image assignment data 22 includes sets of images ($\{images\}_i$) that are assigned to respective ones ($page_i$) of N pages, where i has an integer value ranging from 1 to N. In accordance with this method, the page layout module 14 selects a partition for each $page_i$ (block 30) and generates a layout from the partition selected for each $page_i$ (block 32). After each $page_i$ has been processed (block 33), the page layout module 14 stops processing the image assignment data 22 (block 34) and transmits the initial album 26 to the graphical user interface module 18 for presentation to the user.

Detailed descriptions of the page partition selection process (block 30) and the layout generation process (block 32) are provided below.

A. Partitioning a Page

In some approaches, the page layout module 14 selects an optimal page partition using a stochastic optimization process that seeks to identify the page partition that has the highest fitness or score. Additional details of one exemplary stochastic approach for identifying an optimal page partition may be obtained from U.S. patent application Ser. No. 10/675,724, which was filed on Sep. 30, 2004.

In other approaches, including the embodiments described below, the page layout module 14 selects an optimal page partition using a deterministic process that seeks to maximize page coverage while avoiding image overlap. In an exemplary one of these deterministic approaches, the page layout module 14 computes a layout score that corresponds to coverage, which is defined as the fraction of the page occupied by images. In other embodiments, the page layout module 14 may select an optimal page partition based on a different layout score, such as layout scores based on user preferences and visual factors.

In the illustrated embodiments, each of the images 20 is assigned a respective aspect ratio and a respective positive scalar-valued relative area proportion. The aspect ratio is defined as the ratio of image height to image width. The relative area proportion assigned to a given image $A_j$ is defined as the area $A_j$ of the rendered version of the given image j relative to the areas of the rendered versions of the other images appearing on the same page. Thus, for any two photos j and k on the same page, the ratio of the relative area proportions equals the ratio of rendered areas $A_j$ and $A_k$:

$$\frac{A_j}{A_k} = \frac{e_j}{e_k} \tag{1}$$

In some embodiments, the user is allowed to set the relative area proportion values that are assigned to the images. In other embodiments, the image albuming system automatically assigns the relative area proportion values to the images.

Figure 3:
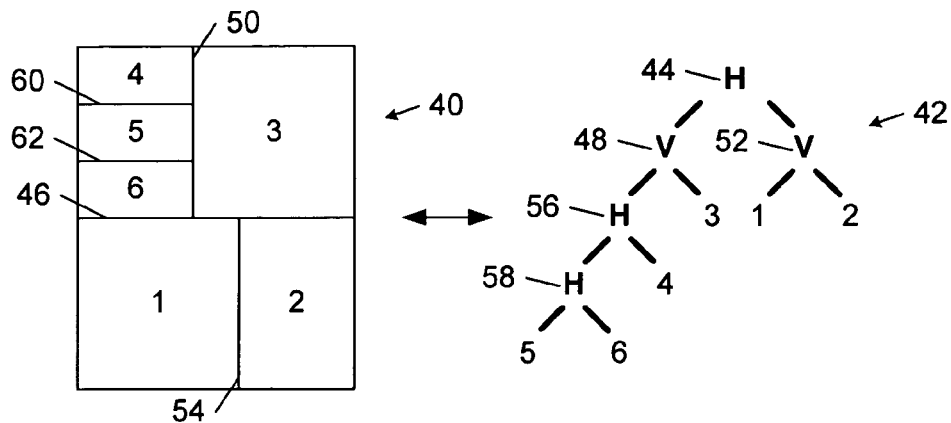
FIG. 3 is a diagrammatic view of a partition of a page and a hierarchical tree structure corresponding to the page partition.

Referring to FIG. 3, the page layout module 14 divides each page 40 in an album in accordance with a respective hierarchical partition, which is represented by a tree structure 42. Each leaf node of the tree structure 42 corresponds to a respective image (1, 2, 3, 4, 5, 6) on the page 40. Each interior node (H, V) of the tree structure 42 corresponds to one of either a horizontal or a vertical division of the corresponding page 40. In the exemplary partition of page 40 and the corresponding tree structure 42, the root H node 44 represents the horizontal division 46 of page 40. The left interior V node 48 represents the left vertical division 50 of page 40, and the right interior V node 52 represents the right vertical division 54 of page 40. The interior H nodes 56, 58 respectively represent the horizontal divisions 60, 62 of page 40. The positions of leaf nodes in the tree structure 42 specify the unique locations of the corresponding images (1, 2, 3, 4, 5) on the page 40.

Figure 4A:
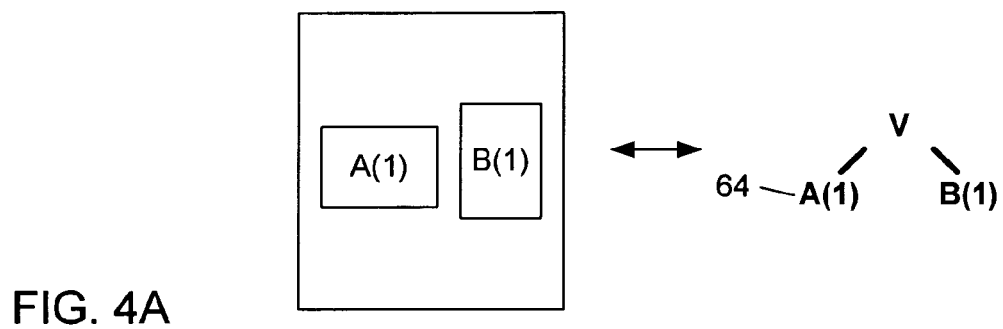
FIGS. 4A-4C are diagrammatic views of different partitions of a page and corresponding hierarchical tree structures.
Figure 4B:
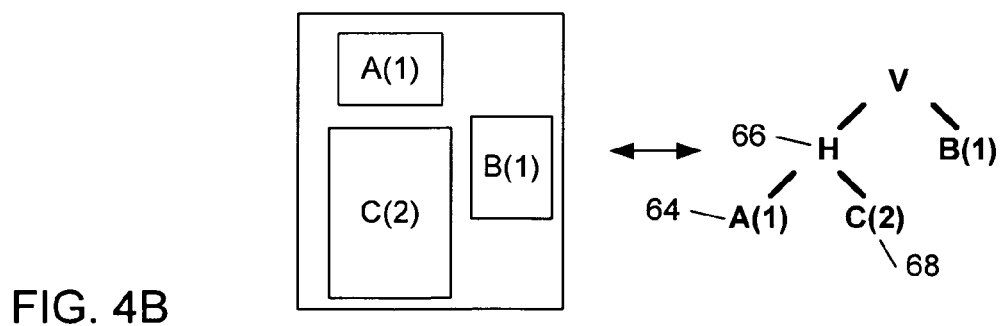
Figure 4C:
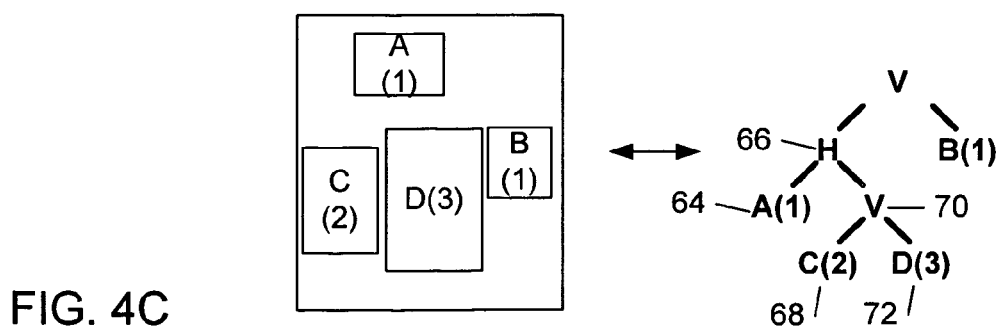

FIGS. 4A-4C illustrate a process of generating a binary tree structure by adding one image to the current tree structure at a time, where the numbers in parentheses are the relative areas assigned to the corresponding images A, B, C, D. In this process, each node in the tree structure is associated with a bounding box in the layout of a page. Each interior node is associated with a bounding box around the boxes of its two child nodes, and each leaf node is associated with a cell where a respective image is to be placed.

The tree structure generation process begins with a single image, and additional images are added to the tree structure one at a time until all of the images that are assigned to the page have been added. If the total number of images assigned to a page is M, the layout for the page corresponds to the last in an increasing sequence of binary trees:

$$T(1), T(2), \ldots, T(M) \tag{2}$$

where $T(p)$ for $p \geq 1$ denotes a tree with p terminal nodes. Each of the intermediate trees $\{T\{p\}:1 \leq p \leq N-1\}$ generates a viable layout.

Each new image is added to the tree structure by introducing a new cell to the previous layout. Thus, image C is added to the sub-tree structure 64 shown in FIG. 4A by displacing the sub-tree structure 64 with a new interior H node 66 shown in FIG. 4B. The new interior H node 66 becomes the parent of a new leaf node 68 corresponding to the new cell C(2) and the sub-tree 64 that was displaced. Similarly, the image D is added to the sub-tree structure 68 shown in FIG. 4B by displacing the sub-tree structure 68 with a new internal V node 70 shown in FIG. 4C. The new internal V node 70 becomes the parent of a new leaf node 72 corresponding to the new cell D(3) and the sub-tree 68 that was displaced. In the example illustrated in FIGS. 4A-4C, the selected sub-trees 64 and 68 that are displaced happened to be leaf nodes; in general, however, any sub-trees could have been selected, including sub-trees that are rooted at interior nodes.

The page layout module 14 selects which cell is introduced into a previous layout by evaluating a collection of candidate layouts. Each candidate layout corresponds to the previous layout with the new image inserted into a different new cell location. The page layout module 14 selects the cell for which the resulting layout has the highest score. That is, assuming that the p-th intermediate layout, which is represented by the tree structure T(p), has a set $\Re$ of possible new cells and that the tree structure T(p), which is augmented by adding the new cell $l \in \Re$, is denoted as T(p; l), then the next intermediate layout is determined as:

$$T(p+1) = T(p; L) \qquad (3)$$
where
$$L = \underset{l \in R}{\mathrm{argmax}}\,[\mathrm{score}\,(T(p;l))] \qquad (4)$$

and where score(.) is the scoring function.

The cost of adding each next image to the layout increases linearly with the number of images. In particular, since there are (2p−1) nodes in T(p) and the new cell can be positioned either vertically or horizontally relative to the box of the displaced sub-tree, $\|\Re\|=2(2p-1)$ for intermediate tree structure T(p). However, typical album pages tend to have sufficiently few images that the computational cost of evaluating all possible candidate layouts typically is not significant.

B. Generating a Layout from a Page Partition

Figure 5:
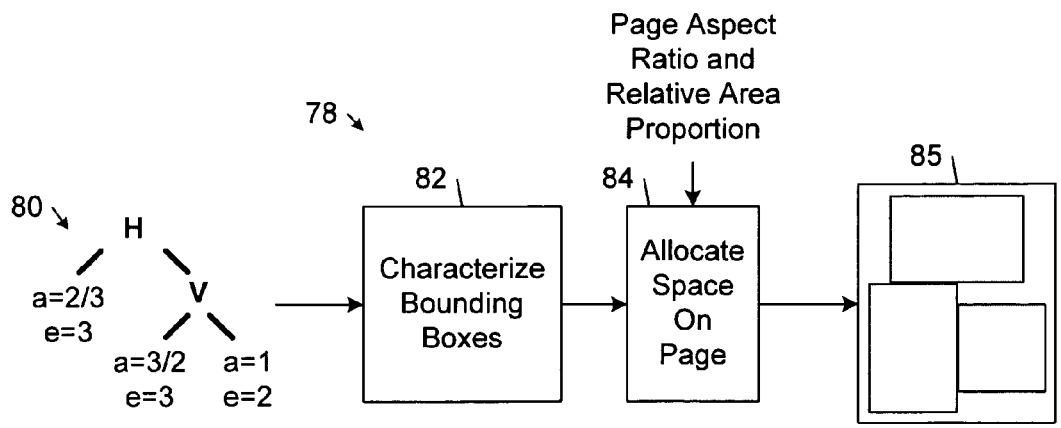
FIG. 5 is a flow diagram of an embodiment of a method of rendering an album page layout based on a partition of a page.

FIG. 5 shows an embodiment of a method 78 by which the page layout module 14 generates a layout from a page partition that has been selected for a page 85. The page partition is represented by a tree structure 80. Each leaf node of the tree structure has an aspect ratio value (a) and a relative area proportion value (e) and each interior node indicates either a horizontal or vertical division of the page. The layout generation method 78 involves characterizing the bounding boxes for the nodes (block 82), and allocating a precise region of page space to each node (block 84). The allocated regions of the page 85 are nested like the tree structure 80. The allocated regions are referred to herein as "cells". In some implementations, once a cell is known, the position of an image assigned to the cell is determined by centering the image in the cell. The area of the image is determined using the method described below.

1. Characterizing Bounding Boxes

Figure 6:
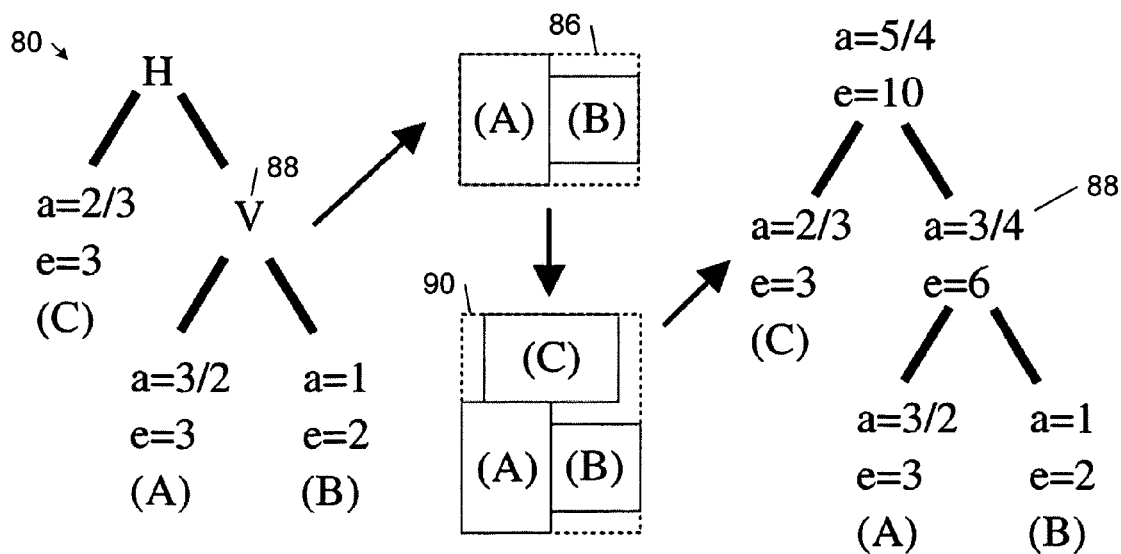
FIG. 6 is a diagrammatic view of an implementation of a method computing bounding boxes in accordance with the album page layout rendering embodiment of FIG. 5.

The objective of the bounding box characterization process (block 82) is to compute an aspect ratio value and relative area value for each interior node in the tree structure 80. Each bounding box is determined by the boxes it encloses. In some implementations, the bounding box characterization process begins at the leaf nodes and works toward the root node, in the order of a depth-first search, as illustrated in FIG. 6.

The formulas for the aspect ratio and relative area of any interior node are given below. In general, for any image bounding box with an aspect ratio a, and a relative area e, the quantities $\sqrt{ae}$ and $\sqrt{e/a}$ are the relative height and relative width of the image bounding box, respectively. The aspect ratio a, and the relative area e for any interior node are functions of the aspect ratios and relative areas of its two children. In the following equations, $a_r$ and $e_r$ are the aspect ratio and relative area of the right-hand child node, and $a_l$ and $e_l$ are the aspect ratio and relative area of the left-hand child node. Thus, if the right-hand and left-hand child nodes are arranged side-by-side:

$$a = \frac{\sqrt{a'e'}}{\sqrt{e_l/a_l} + \sqrt{e_r/a_r}} \qquad (5)$$

$$e = \sqrt{a'e'}\left(\sqrt{e_l/a_l} + \sqrt{e_r/a_r}\right) \qquad (6)$$
where
$$\sqrt{a'e'} = \max_{i \in \{r,l\}}\left(\sqrt{a_i e_i}\right) \qquad (7)$$

The aspect ratio in equation (5) is the ratio of the greater relative height divided by the sum of the two relative widths, and the relative area in equation (6) is the product of the greater relative height and the sum of the two relative widths. Finding the maximum in equation (7) determines which of the two child node boxes is relatively taller, and therefore governs the height of the parent node box.

If the two child nodes represent boxes that are arranged one on top of the other:

$$a = \frac{\sqrt{a_l e_l} + \sqrt{a_r e_r}}{\sqrt{e'/a'}} \qquad (8)$$

$$e = \left(\sqrt{a_l e_l} + \sqrt{a_r e_r}\right)\sqrt{e'/a'} \qquad (9)$$
where
$$\sqrt{e'/a'} = \max_{i \in \{r,l\}}\left(\sqrt{e_i/a_i}\right) \qquad (10)$$

In this case, equation (10) determines which of the two child node boxes is relatively wider, and therefore governs the width of the parent node box.

The bounding box of the root node conveys the shape and relative area of the entire layout corresponding to the tree structure 80. The bounding box of the root node is referred to herein as the "principal bounding box".

Since the relative areas are consistent throughout the tree structure 80, the corresponding layout can be scored as soon as the bounding boxes of the interior nodes have been computed. In some exemplary implementations, the scoring function corresponds to coverage. In these implementations, for a tree T, the fraction of the page that is covered by an image is given by:

$$\mathrm{score}\,(T) = \Psi \frac{\sum_{i=1}^{M} e_i}{e_{pbb}} \frac{\min\{a_{pbb}, a_{page}\}}{\max\{a_{pbb}, a_{page}\}} \qquad (11)$$

where $\Psi$ is a constant described below; M is the number of images on the page; $e_i$ is the relative area of image i; $e_{pbb}$ and $a_{pbb}$ are the relative area and aspect ratio of the principal bounding box; and $a_{page}$ is the aspect ratio of the usable area of the page.

In the example shown in FIG. 6, the bounding box 86 for interior node 88 encloses the bounding boxes of leaf nodes A and B, which are arranged side-by-side. Therefore, using equations (5) and (6), the bounding box 86 is characterized by an aspect ratio of 3/4 and a relative area proportion of 6. The principal bounding box 90 encloses the bounding boxes of leaf node C and interior node 88. Therefore, using equations (5) and (6), the principal bounding box 90 has an aspect ratio of 5/4 and a relative area proportion of 10.

2. Allocating Regions of Page Space to Nodes

Referring to FIG. 7, in some implementations, the process of allocating regions of page space to nodes (block 84; FIG. 5) involves dividing a page 89 into cells 91, 92, 93, and positioning each image in its respective cell. The page 89 is divided into cells 91-93 by splitting the page into rectangles, starting with the entire usable area of the page 89 as the first rectangle. Each split is accomplished by drawing a line segment for a respective one of the interior nodes, starting at the root node in order of a breadth-first search.

In the case of an interior node corresponding to a vertical division, the page layout mode 14 selects a horizontal position x along the width of the available region. In one formulation, $x \in (0,1)$, where x=0 represents the leftmost position and x=1 represents the rightmost position. In this case, $$x = \frac{\sqrt{e_l/a_l}}{\sqrt{e_l/a_l} + \sqrt{e_r/a_r}} \tag{12}$$

where $a_l$, $e_l$, and $a_r$, $e_r$ are the aspect ratios and relative areas of the bounding boxes for the left and right children of the interior node. This formulation makes direct use of relative widths as proportions. The analogous formula for a horizontal division uses the relative heights. That is, if the vertical position along the height of the available space is denoted $y \in (0,1)$, where y=0 represents the bottom position and y=1 represents the top position:

$$x = \frac{\sqrt{e_b a_b}}{\sqrt{e_b a_b} + \sqrt{e_t a_t}} \tag{13}$$

where $a_b$, $e_b$, and $a_t$, $e_t$ are the aspect ratios ad relative areas of the bounding boxes for the bottom and top children of the interior node.

The area $A_i$ for image i is computed from the relative area proportion assigned to the image i:

$$A_i = \Psi \frac{e_i}{e_{pbb}} A_{pbb} \tag{14}$$

where $A_{pbb}$ is an area for the principal bounding box, which is computed as follows:

$$A_{pbb} = A_{page} \frac{\min\{a_{pbb}, a_{page}\}}{\max\{a_{pbb}, a_{page}\}} \tag{15}$$

where $A_{page}$ is the area of the usable page space. $\Psi$ is a scalar that is used to shrink each image from the maximum area it could have as dictated by parameters of the tree structure 80. Setting $\Psi$ between 0 and 1 creates a buffer space around each image. In one exemplary implementation, $\Psi=0.95^2$.

3. Results

FIGS. 8A and 8B show two different layouts of the same image collection. For the layout shown in FIG. 8A, the images are laid out on a single square page. For the layout shown in FIG. 8B, the images are divided into two groups of four images each, and a page aspect ratio of 8.5 inches by 11 inches is used. The page layout module 14 efficiently lays out the images on the pages. For example, the wide image 94 is positioned at the bottom of the first page of the album shown in FIG. 8B, affording greater space for the other three images on the page. In addition, since each image has an assigned relative area proportion of 1, on any given album page, all images have the same area regardless of their aspect ratios.

Figure 9A:
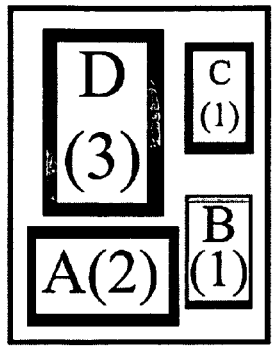
FIGS. 9A-9C show respective exemplary layouts of four images with different respective relative area assignments.
Figure 9B:
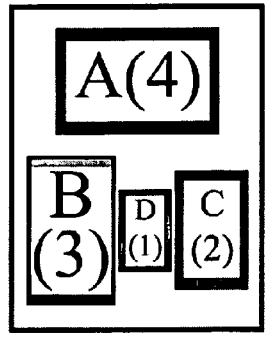
Figure 9C:
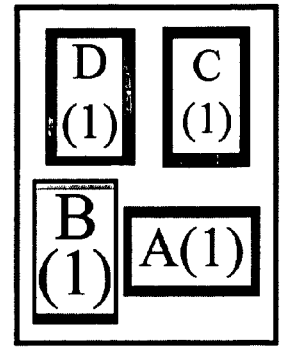

FIGS. 9A-9C show three layouts for the same images, but with different assignments of relative areas. For example, in the layout of FIG. 9A, the area of image A is twice that of image B, and ⅔ the area of image D. The assignment of relative areas to images strongly influences each page layout as a whole.

III. Editing a Layout of Images on a Page

Figure 10:
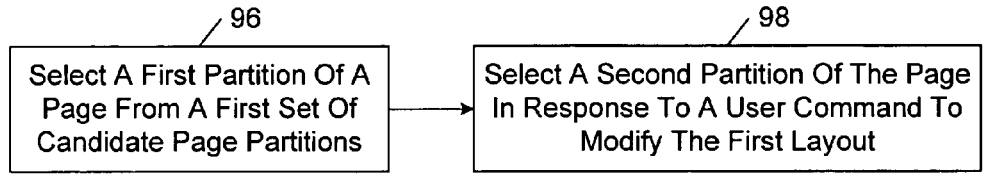
FIG. 10 is an embodiment of a method of albuming pages.

Referring to FIG. 10, in the image layout generation processes described above, the page layout module 14 selects a first partition of a page from a first set of candidate page partitions (block 96). The first partition corresponds to a first layout of a first set of images on the page. Each of the candidate page partitions in the first set corresponds to a respective layout of the first set of images on the page. After the page layout module 14 generates the first layout for an album page, the image albuming system 10 presents the album 26 to a user through the user interface 18. The user interface 18 allows a user to interactively browse the album 26 and to specify edits to the album 26. As explained in detail below, in response to a user command to modify the first layout, the image albuming system 10 selects a second partition of the page corresponding to a second layout of a second set of images on the page (block 98).

A. The User Interface

Figure 11:
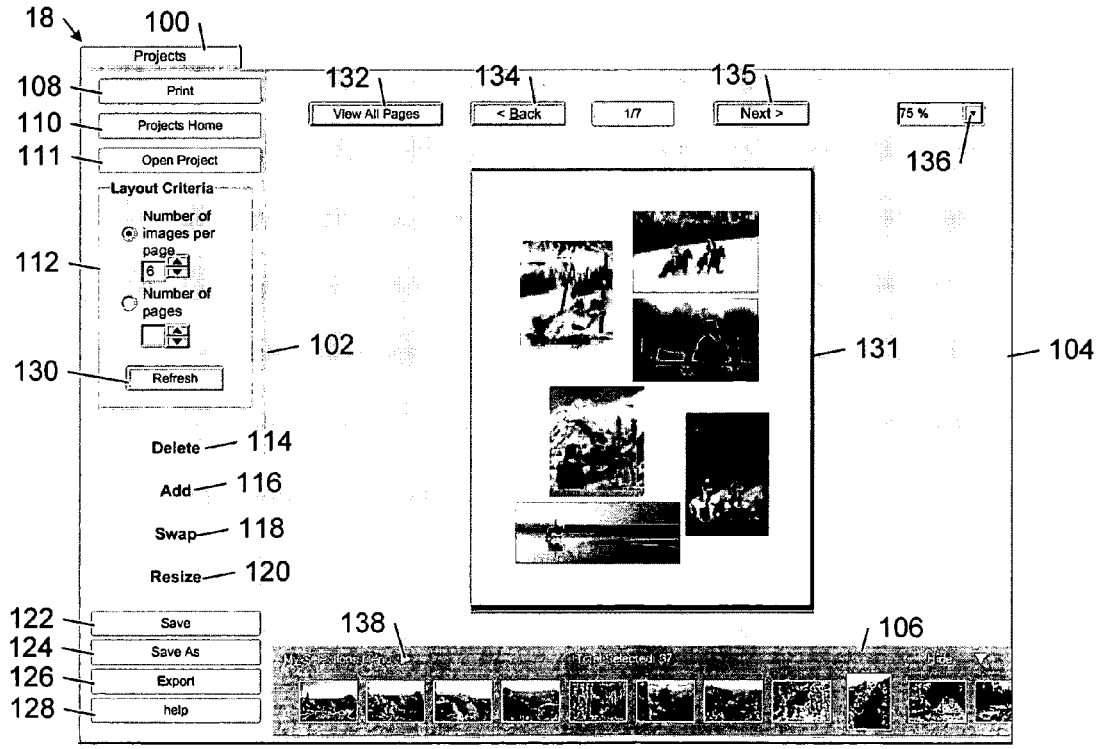
FIG. 11 is an embodiment of a user interface for interacting with the image albuming system of FIG. 1.

In the implementation illustrated in FIG. 11, the user interface 18 includes a Projects window 100 that includes a command pane 102, an album display pane 104, and an image selection pane 106.

The command pane 102 includes a set of commands for controlling various operational aspects of the image albuming system 10. In particular, the command pane 102 includes: a Print command button 108; a Projects Home command button 110; an Open Project command button 111; a Layout Criteria group box 112; a Delete command button 114; an Add command button 116; a Swap command button 118; a Resize command button 120; a Save command button 122; a Save As command button 124; an Export command button 126; and a help command button 128. Briefly:

The Print command button 108 opens a print interface that allows a user to specify various parameters for printing one or more pages of the current album project.

The Projects Home command button 110 opens the home page of the user interface 18 that presents a number of high-level command options to the user.

The Open Project command button 111 opens a menu that allows a user to open a previously saved album project.

The Layout Criteria group box 112 allows the user to set the layout criteria for the album. In particular, the user may set the number of images per page or the number of pages in the album. The Refresh command button 130 directs the image albuming system 10 to revise the layout of current album project in accordance with any changes to the layout criteria specified in the Layout Criteria group box 112.

The Delete, Add, Swap, and Resize command buttons 114, 116, 118, 120 allow the user to specify specific edits to the album 26, as explained in detail below.

The Save command button 122 opens a window that allows a user to save the current working state of the current album project under the current file name or under a new file name if one has not been previously selected.

The Save As command button 124 opens a window that allows a user to save the current working state of the current album project under a new file name.

The Export command button 126 opens a window that allows a user to export the current album project into a different electronic format.

The help command button 128 opens a help window the allows a user to browse a user manual describing the features of the user interface 18 or search for a description of a specific feature of the user interface 18.

The album display pane 104 includes a View All Pages command button 132, which directs the user interface 18 to present all of the pages 131 of the current album project in the album display pane 104. The album display pane 104 also includes Back and Next command buttons 132, 134 that direct the user interface 18 to present the previous page of the current album project and the next page of the current album project, respectively. The album display pane 104 additionally includes a drop down menu 136 for specifying the viewing size of the album pages 131.

The image selection pane 106 displays a set of images in a collection. The image selection pane 106 includes a My_Selections Menu command button 138 that opens a window that allows a user to specify which images are displayed in the image selection pane 106. The user selects a set of images from the images displayed in the image selection pane 106, and the image albuming system 10 generates the current album project from the selected images.

B. Changing the Number of Images in a Layout

A user may change the number of images in a current layout by deleting images from a current layout or by adding images to a current layout.

Figure 12:
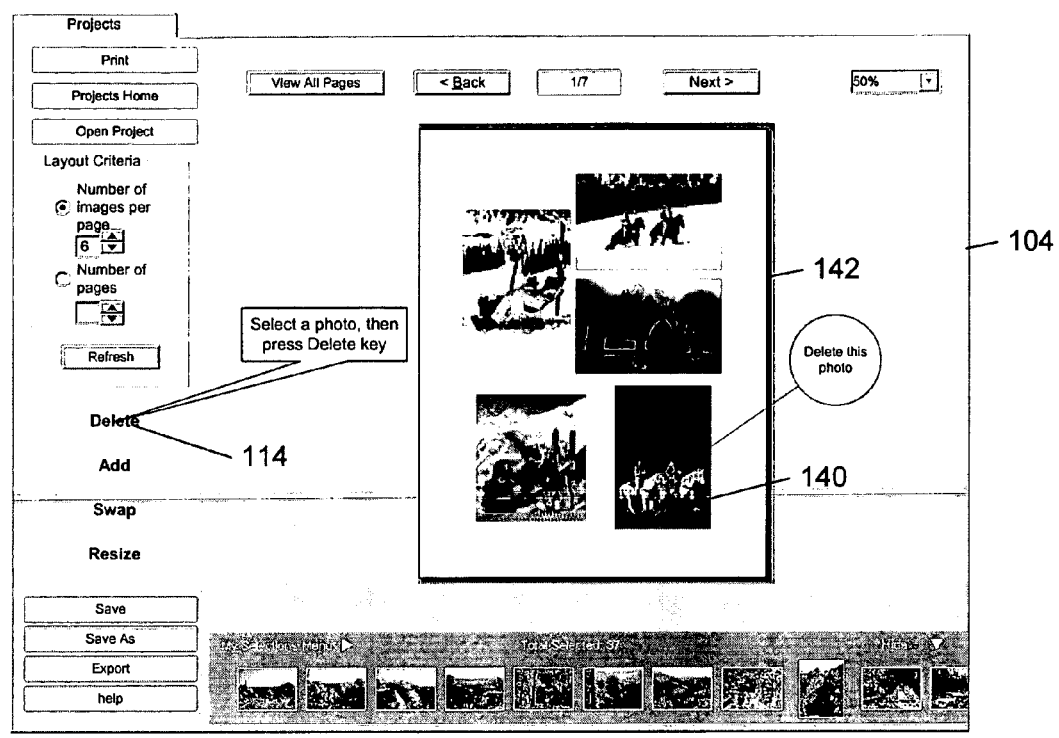
FIGS. 12 and 13 illustrate an exemplary method of deleting an image from an album page layout using the user interface of FIG. 11.
Figure 13:
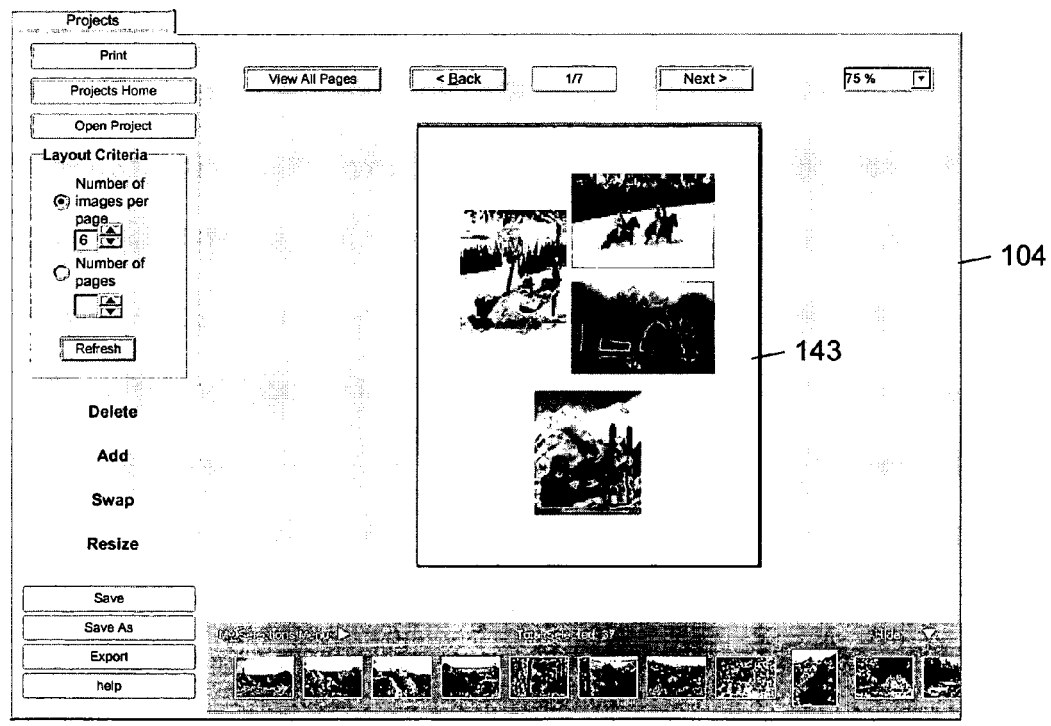

Referring to FIGS. 12 and 13, in some implementations, a user deletes an image 140 from a page 142 of the current album project by selecting the image 140 using a pointing device, such as a mouse pointer, and selecting the Delete command button 114. The user interface module 18 interprets the user inputs and transmits the instructions to delete image 140 from album page 142 to the page layout module 14. The page layout module 14 automatically generates a new layout for page 142 with the selected image 140 removed. In this process, the page layout module 14 deletes the leaf node corresponding to the image 140 from the tree structure for album page 142, replaces the parent of the leaf with the former sibling of the leaf, and generates a new page layout based on the new tree structure in accordance with the page space allocation process described above. The user interface 18 displays the modified page layout 143 in the album display pane 104, as shown in FIG. 13.

Figure 14:
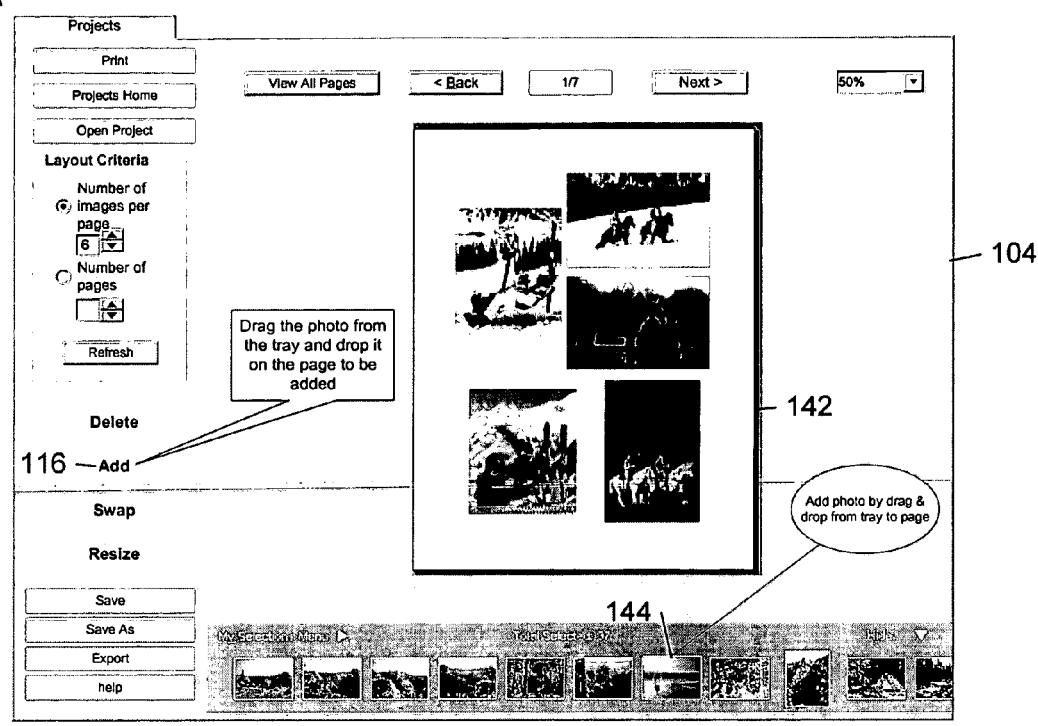
FIGS. 14 and 15 illustrate an exemplary method of adding an image to an album page layout using the user interface of FIG. 11.
Figure 15:
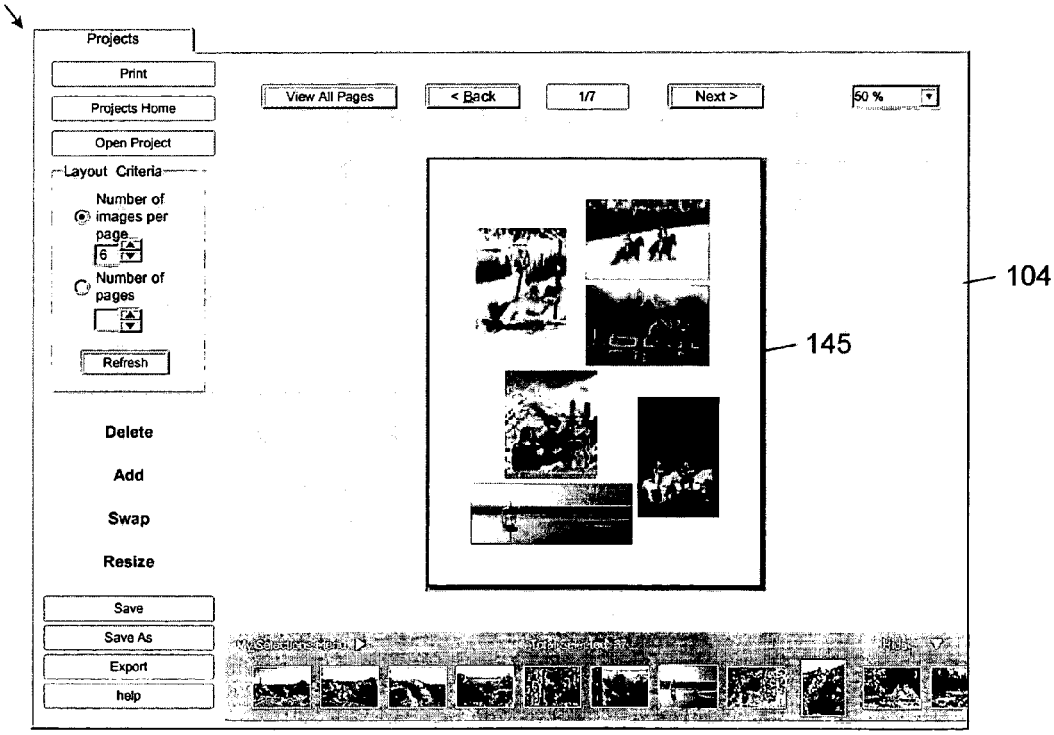

Referring to FIGS. 14 and 15, in some implementations, a user adds an image 144 in the image selection pane 106 to the page 142 of the current album project by dragging the image 144 from the image selection pane 106 onto the album page 142. The user interface module 18 interprets the user inputs and transmits the instructions to add image 144 to the page layout module 14. In response, the page layout module 14 automatically generates a new layout for the page 142 with the selected image 144 added. In this process, the page layout module 14 adds a new leaf node to the tree structure for the album page 142 in accordance with the page partitioning process described in detail above. The page layout module 14 generates a new page layout based on the new tree structure in accordance with the page space allocation process described above. The user interface 18 displays the modified page layout 145 in the album display pane 104, as shown in FIG. 15.

In other implementations, a user may add an image in the image selection pane 106 to the page of the current album project by dragging the image from the image selection pane 106 to a particular location on the album page. As the user drags the selected image over the album page, the user interface 18 indicates areas in the album page where the selected image is insertable. In this process, the user interface 18 highlights or otherwise indicates locations near the location of the dragged image where the selected image would appear in an updated version of the album page if the user releases the dragged image at its current location. The user interface module 18 interprets the user inputs and transmits the instructions to add the selected image at the selected page location to the page layout module 14. In response, the page layout module 14 automatically generates a new layout for the page with the selected image added at the selected location. In this process, the page layout module 14 adds a new leaf node to the tree structure for the album page at a location in the tree structure for the album page corresponding to the selected location of the album page. The page layout module 14 generates a new page layout based on the new tree structure in accordance with the page space allocation process described above. The user interface 18 displays the modified page layout in the album display pane 104.

C. Rearranging Images in a Layout

A user may rearrange images in a current layout by swapping the positions of two images on an album page or by moving an image on the album page to another location on the album page.

Figure 16:
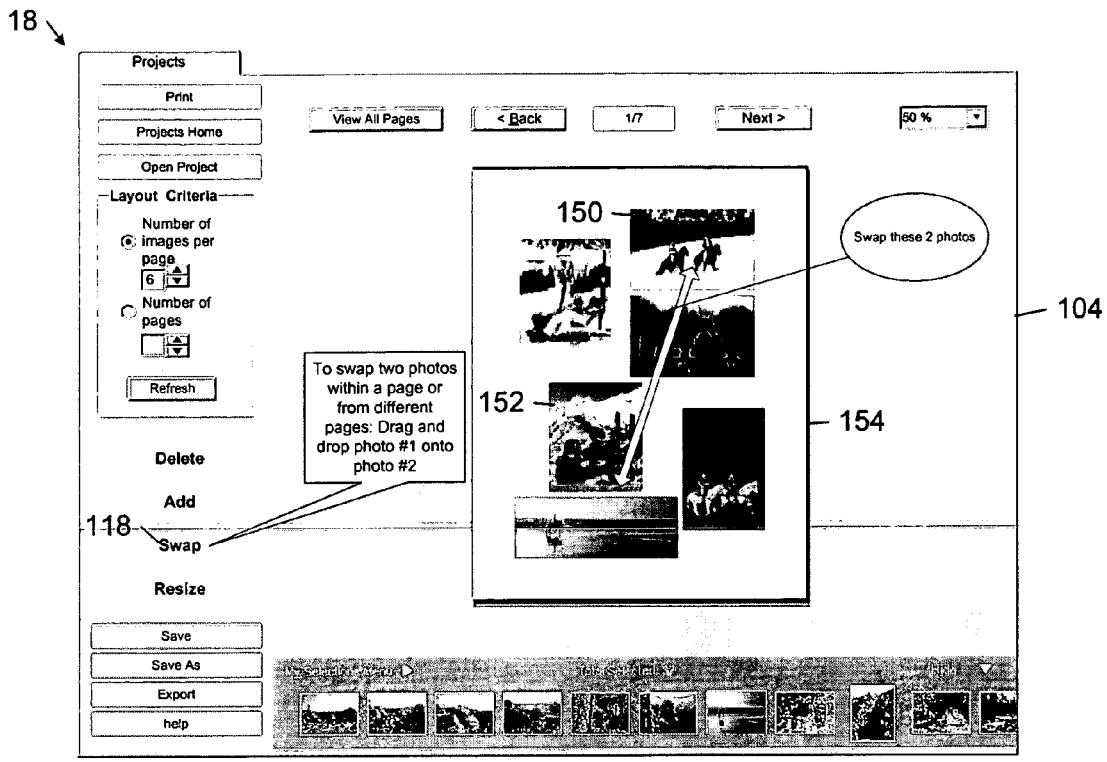
FIGS. 16 and 17 illustrate an exemplary method of swapping the locations of images an album page layout using the user interface of FIG. 11.
Figure 17:
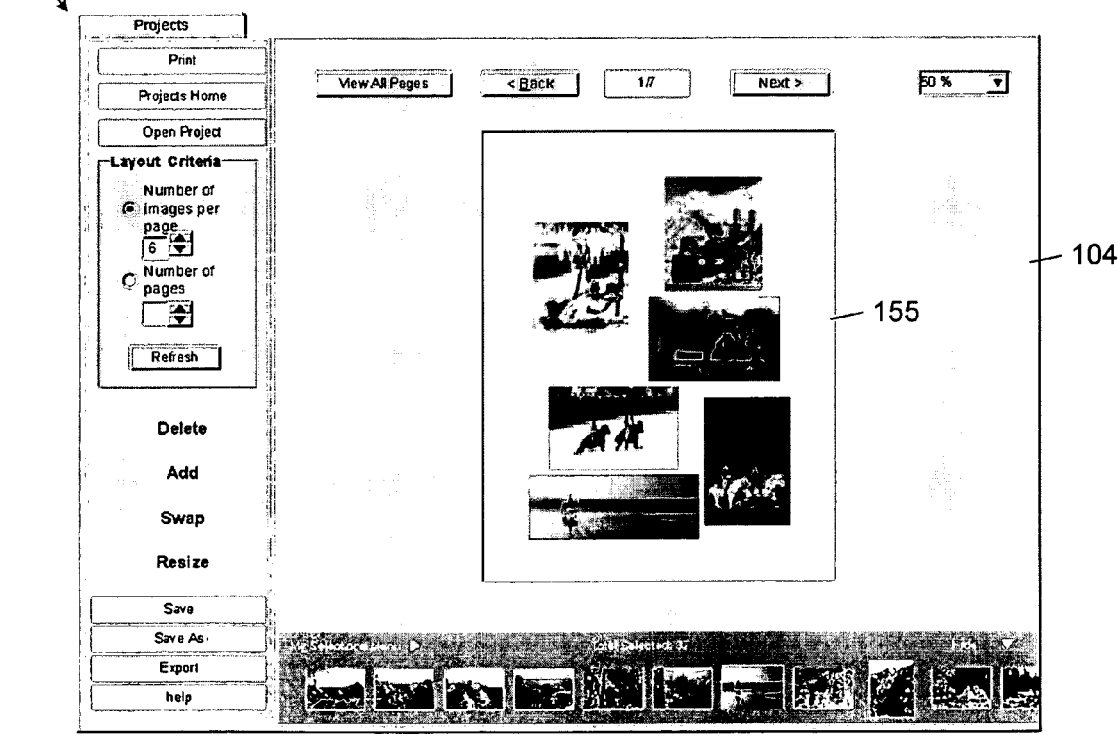

Referring to FIGS. 16 and 17, in some implementations, a user swaps the positions of two images 150, 152 on an album page 154 by selecting the images 150, 152 using a pointing device, and selecting the Swap command button 118. The user interface module 18 interprets the user inputs and transmits the instructions to swap the positions of images 150, 152 to the page layout module 14. The page layout module 14 automatically generates a new layout for page 154 with the positions of the selected images 150, 152 swapped. In this process, the page layout module 14 swaps the leaf nodes corresponding to the selected images 150, 152 in the tree structure for album page 154. The page layout module 14 generates a new page layout based on the new tree structure in accordance with the page space allocation process described above. The user interface 18 displays the modified page layout 155 in the album display pane 104, as shown in FIG. 17.

Figure 18:
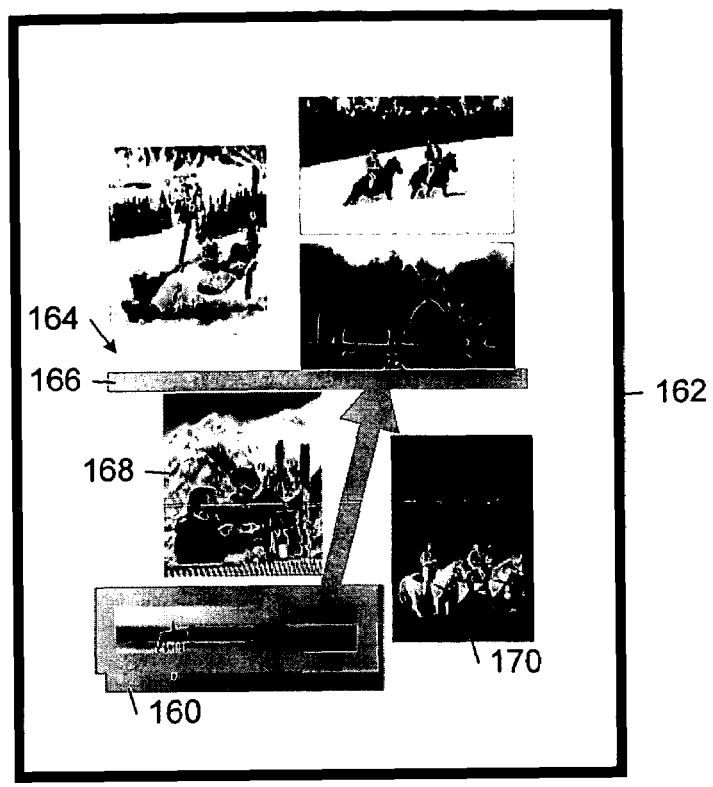
FIGS. 18 and 19 illustrate an exemplary method of moving an image from one position to another position in an album page layout using the user interface of FIG. 11.
Figure 19:
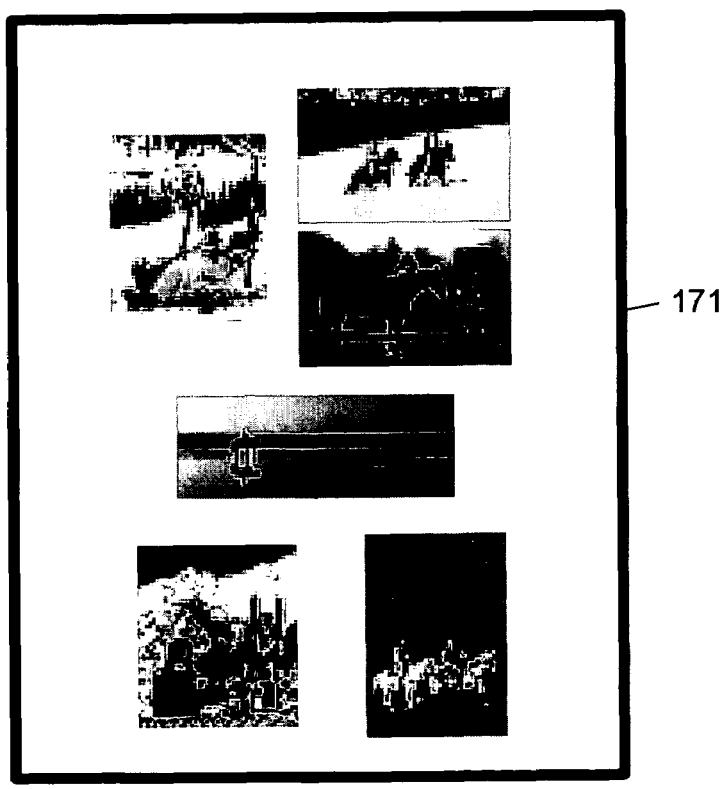

Referring to FIGS. 18 and 19, in some implementations, a user may move a selected image 160 in an album page 162 by dragging the selected image 160 from one location on the album page 162 to another location 164. As the user drags the selected image 160 over the album page 162, the user interface 18 indicates areas in the album page 162 where the selected image 160 is insertable. In the process, the user interface 18 highlights or otherwise indicates locations near the location of the dragged image where the selected image 160 would appear in an updated version of the album page 162 if the user releases the dragged image at its current location. For example, in the example shown in FIG. 18, the user interface 18 lights up a colored bar 166 at a location in the album page 162 where the selected image 160 would be inserted. In the illustrated example, the colored bar 166 is lit up adjacent to the top borders of the two images 168, 170, indicating that the selected image 160 would be moved to a location above both images 168, 170. Similarly, a bar that is lit up along the left or right side of a particular image would indicate that the selected image would be moved to that side of the particular image. The user interface module 18 interprets the user inputs and transmits the instructions to move the selected image to the page layout module 14. In response, the page layout module 14 automatically generates a new layout for the page with the selected image added at the selected location. In this process, the page layout module 14 moves the leaf node corresponding to the selected image to the location in the tree structure corresponding to the selected location of the album page. The page layout module 14 generates a new page layout based on the modified tree structure in accordance with the page space allocation process described above. The user interface 18 displays the modified page layout 171 in the album display pane 104, as shown in FIG. 19.

D. Changing Characteristics of an Image in a Layout

A user may change the characteristics of a selected image in an album page by resizing the selected image or cropping the selected image.

Figure 20:
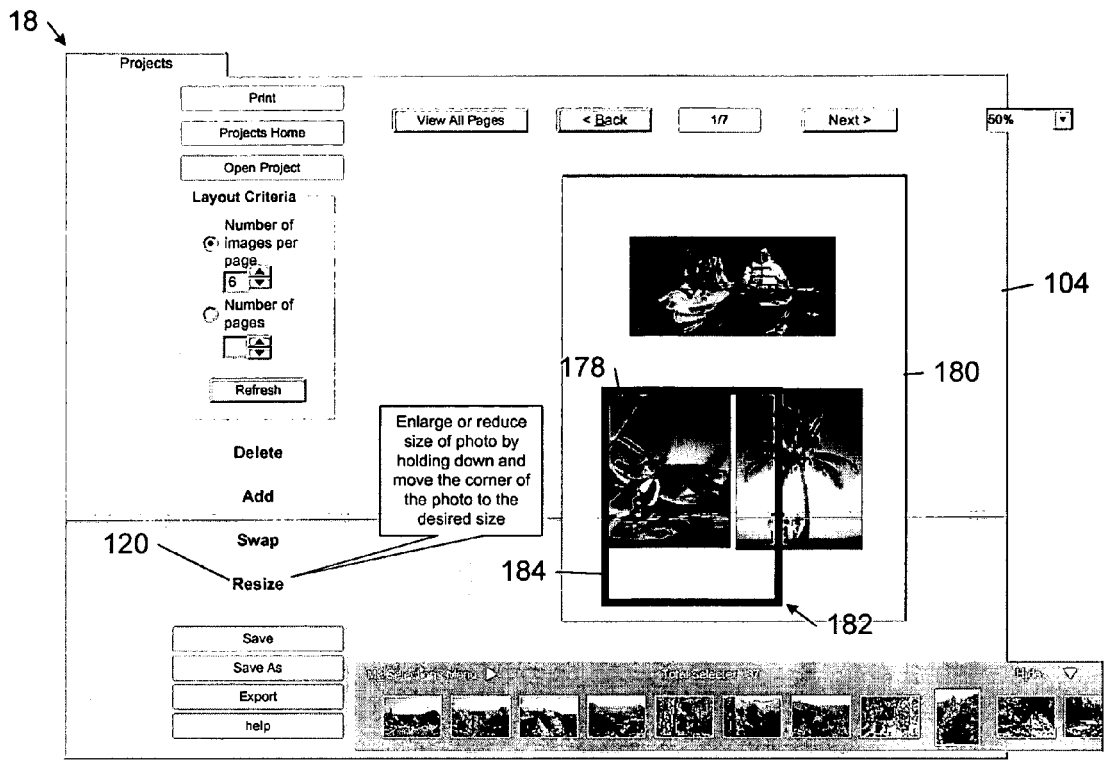
FIGS. 20 and 21 illustrate an exemplary method of resizing an image in an album page layout using the user interface of FIG. 11.
Figure 21:
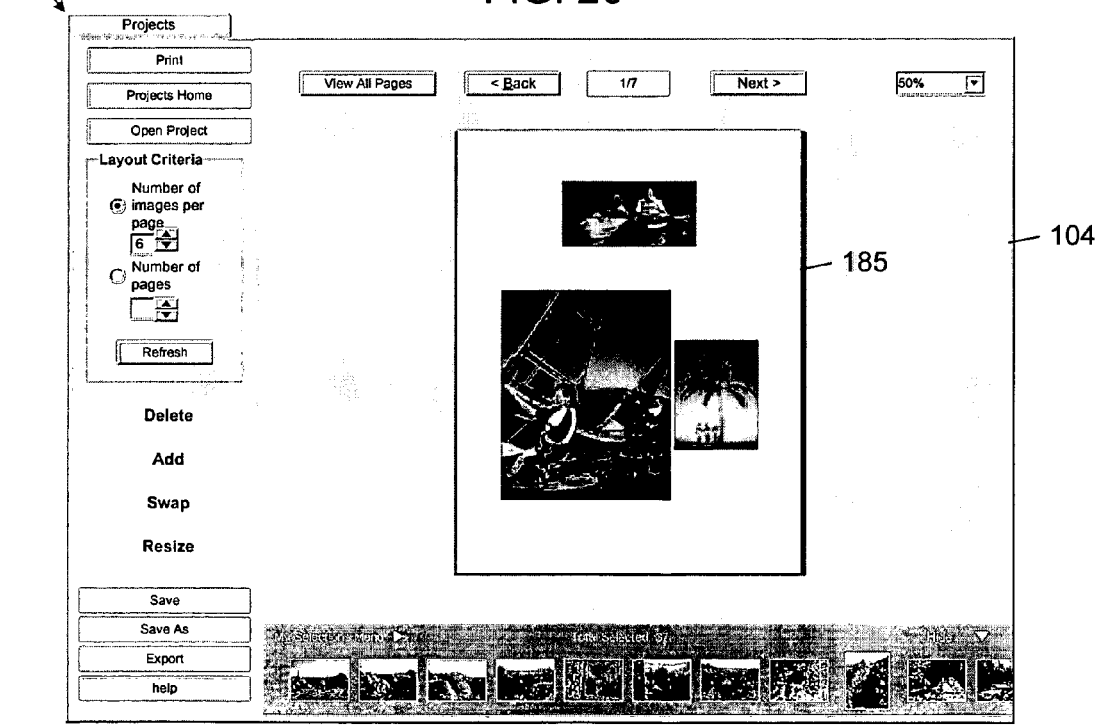

Referring to FIGS. 20 and 21, a user resizes an image 178 in an album page 180 by selecting the image 178 using a pointing device, selecting the Resize command button 120, and dragging a corner 182 of the selected image 178 to set the size of the selected image 178 relative to the other images on the album page 180. In the illustrated implementation, the user interface 18 displays a border 184 that corresponds to the resized version of the selected image 178. In other implementations, the outlines of all of the images on album page 180 are adjusted in real time as the user drags the corner of the selected image 178, thereby showing the actual layout of the images on the album page 180 that would result from the resizing operation. The user interface module 18 interprets the user inputs and transmits the instructions to resize the selected image 178 to the page layout module 14. The page layout module 14 automatically generates a new layout for page 180. In this process, the page layout module 14 adjusts the relative area proportion value assigned to the tree node corresponding to the selected image 178 in accordance with the user's resizing instruction. The page layout module 14 generates a new page layout based on the new tree structure in accordance with the page space allocation process described above. The user interface 18 displays the modified page layout 185 in the album display pane 104, as shown in FIG. 21.

In some implementations, a user may crop an image in an album page by double-clicking the image using a pointing device. In response, the user interface 18 displays the selected image in its own editing window, which includes an image cropping tool. The user may apply the image cropping tool to the selected image displayed in the editing window. After the user has cropped the selected image, the user may enter a command (e.g., the escape key) that returns to the album display pane 104. The user interface module 18 interprets the user inputs and transmits the instructions to crop the selected image to the page layout module 14. The page layout module 14 automatically generates a new layout for the album page. In this process, the page layout module 14 adjusts the aspect ratio value assigned to the tree node corresponding to the selected image in accordance with the user's cropping instruction. The page layout module 14 generates a new page layout based on the new tree structure in accordance with the page space allocation process described above. The user interface 18 displays the modified page layout in the album display pane 104.

IV. CONCLUSION

Other embodiments are within the scope of the claims.

The systems and methods described herein are not limited to any particular hardware or software configuration, but rather they may be implemented in any computing or processing environment, including in digital electronic circuitry or in computer hardware, firmware, or software. In general, the systems may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

What is claimed is:

1. A machine-implemented method of albuming images, comprising:

automatically selecting a first partition of a page corresponding to a first layout of a first set of images on the page, wherein the first page partition is selected automatically from a first set of candidate page partitions based on scores that respectively are assigned to the candidate page partitions, each of the candidate page partitions corresponds to a different respective layout in accordance with which each of the images in the first set is positioned in a different respective non-overlapping location on the page, and each of the candidate page partitions comprises a respective set of nominal size values defining respective nominal sizes of the images in the first set of images;

on a display displaying a user interface that shows a graphical representation of the first layout of the first set of images and provides user controls enabling a user to modify one or more of the images in the first layout in terms of size, shape, and position on the page;

via the user interface, receiving at least one user command to modify a selected one of the images in the first layout in at least one of size, shape, and position on the page; and automatically selecting a second partition of the page corresponding to a second layout of a second set of images on the page in response to the user command, wherein the selecting of the second partition comprises modifying the first page partition.

2. The method of claim 1, further comprising selecting the second set of images in accordance with a user command to modify the number of images in the first set of images.

3. The method of claim 2, further comprising setting the second set of images equal to a union of the first set of images and a user-selected image in response to a user command to add the user-selected image to the first layout.

4. The method of claim 3, wherein, in response to the user command to add the user-selected image to the first layout, the second partition is selected automatically from a second set of candidate page partitions based on scores that respectively are assigned to the candidate page partitions, and each of the candidate page partitions in the second set of candidate page partitions corresponds to a different respective layout in accordance with which each of the images in the second set of images is positioned in a different respective non-overlapping location on the page.

5. The method of claim 3, further comprising setting the selected second partition equal to a modified version of the first partition that includes a division of the page for the user-selected image in response to the user command to add the user-selected image to the first layout.

6. The method of claim 2, further comprising setting the second set of images equal to the first set of images minus a user-selected one of the images in the first set in response to a user command to remove the user-selected image from the first layout.

7. The method of claim 6, wherein, in response to the user command to remove the user-selected image from the first layout, the second partition is selected from a second set of candidate page partitions each corresponding to a respective layout of the second set of images.

8. The method of claim 1, further comprising setting the selected second partition equal to a modified version of the first partition in which regions of the page respectively assigned to first and second user-selected images are swapped in response to a user command to swap in the first layout locations of the first user-selected image with the second user-selected image.

9. The method of claim 1, further comprising setting the selected second partition equal to a modified version of the first partition in which a region of the page for a user-selected image in the first partition is relocated in accordance with a user-selected location in the layout corresponding to the first partition in response to a user command to move in the first layout a location of the user-selected image.

10. The method of claim 1, wherein the modifying comprises modifying a respective one of the nominal size values of the first partition corresponding to a user-selected one of the images in the first set of images in response to a user command to resize the user-selected image.

11. The method of claim 1, wherein each of the candidate page partitions comprises a respective set of aspect ratio values defining respective aspect ratios of the images in the first set of images, and the modifying comprises modifying a respective one of the aspect ratio values of the first partition corresponding to a user-selected one of the images in the first set of images in response to a user command to crop the user-selected image.

12. The method of claim 1, wherein each page partition is comprises a respective tree structure having leaf nodes corresponding to respective images in the partition and interior nodes corresponding to respective divisions of the page.

13. The method of claim 12, wherein the modifying comprises modifying the number of leaf nodes in the tree structure of the first partition in accordance with a user command to modify the number of images in the first set of images.

14. The method of claim 13, wherein the modifying comprises adding to the tree structure of the first partition a leaf node corresponding to a user-selected image in response to the user command to add the user-selected image to the first layout.

15. The method of claim 14, wherein the adding comprises adding to the tree structure of the first partition a leaf node corresponding to the user-selected image at a location corresponding to a location in the first layout designated by the user.

16. The method of claim 12, further comprising swapping locations of first and second leaf nodes in the tree structure of the first partition in response to a user command to swap in the first layout locations of a first user-selected one of the images in the first set corresponding to the first leaf node with a second user-selected one of the images in the first set corresponding to the second leaf node.

17. The method of claim 12, further comprising relocating a given leaf node in the tree structure of the first partition in response to a user command to move in the first layout a location of a user-selected one of the images in the first set corresponding to the given leaf node.

18. The method of claim 12, wherein each leaf node is associated with a respective one of the nominal size values, and the modifying comprises modifying a nominal size value associated with a respective one of the leaf nodes corresponding to a user-selected image in response to a user command to resize the user-selected image.

19. The method of claim 12, wherein each leaf node is associated with a respective aspect ratio value defining a respective aspect ratio off a respective one of the images in the first set, and the modifying comprises modifying an aspect ratio value associated with a respective one of the leaf nodes corresponding to a user-selected image in response to a user command to crop the user-selected image.

20. The method of claim 1, further comprising presenting the first layout of the first set of images in a pane of the user interface.

21. The method of claim 20, wherein the user command specifies a location in the pane in which to insert a user-selected image, the selecting of the second partition comprises selecting the second partition that accommodates the image at the specified location, and further comprising indicating an area in the presentation of the first layout in the pane where the user-selected image is insertable in the first layout.

22. The method of claim 21, wherein the indicating comprises highlighting the area in response to a user command dragging the user-selected image near the area.

23. The method of claim 20, further comprising changing sizes and positions of images in the presentation of the first layout in response to the user command.

24. The method of claim 1, wherein the user command specifies a location in the pane in which to insert a user-selected image, the selecting of the second partition comprises selecting the second partition that accommodates the image at the specified location, and further comprising indicating an area in the graphical representation of the first layout where the user-selected image is insertable in the first layout.

25. The method of claim 1, further comprising:
changing sizes and positions of images in the first layout to produce the second layout of the second set of images on the page; and
displaying a graphical representation of the second layout of the second set of images in the user interface on the display.

26. A machine for albuming images, comprising at least one data processing module configured to perform operations comprising:
automatically selecting a first partition of a page corresponding to a first layout of a first set of images on the page, wherein the first page partition is selected automatically from a first set of candidate page partitions based on scores that respectively are assigned to the candidate page partitions, each of the candidate page partitions corresponds to a different respective layout in accordance with which each of the images in the first set is positioned in a different respective non-overlapping location on the page, and each of the candidate page partitions comprises a respective set of nominal size values defining respective nominal sizes of the images in the first set of images;
on a display displaying a user interface that shows a graphical representation of the first layout of the first set of images and provides user controls enabling a user to modify one or more of the images in the first layout in terms of size, shape, and position on the page;
via the user interfaces receiving at least one user command to modify a selected one of the images in the first layout in at least one of size, shape, and position on the page; and
automatically selecting a second partition of the page corresponding to a second layout of a second set of images on the page in response to the user command, wherein the selecting of the second partition comprises modifying the first page partition.

27. The machine of claim 26, wherein the at least one data processing module is configured to select the second set of images in accordance with a user command to modify the number of images in the first set of images.

28. The machine of claim 26, wherein the at least one data processing module is configured to set the selected second partition equal to a modified version of the first partition in which regions of the page respectively assigned to first and second user-elected images are swapped in response to a user command to swap in the first layout locations of the first user-selected image with the second user-selected image.

29. The machine of claim 26, wherein the at least one data processing module is configured to set the selected second partition equal to a modified version of the first partition in which a region of the page for a user-selected image in the first partition is relocated in accordance with a user-selected location in the layout corresponding to the first partition in response to a user command to move in the first layout a location of the user-selected image.

30. The machine of claim 26, wherein in the modifying the at least one data processing module is configured to perform operations comprising modifying a respective one of the nominal size values of the first partition corresponding to a user-selected one of the images in the first set of images in response to a user command to resize the user-selected image.

31. The machine of claim 26, wherein each of the candidate page partitions comprises a respective set of aspect ratio values defining respective aspect ratios of the images in the first set of images and in the modifying the at least one data processing module is configured to perform operations comprising modifying a respective one of the aspect ratio values of the first partition corresponding to a user-selected one of the images in the first set of images in response to a user command to crop the user-selected image.

32. The machine of claim 26, wherein each page partition is comprises a respective tree structure having leaf nodes corresponding to respective images in the partition and interior nodes corresponding to respective divisions of the page.

33. The machine of claim 32, wherein in the modifying the at least one data processing module is configured to perform operations comprising modifying the number of leaf nodes in the tree structure of the first partition in accordance with a user command to modify the number of images in the first set of images.

34. The machine of claim 32, wherein in the modifying the at least one data processing module is configured to perform operations comprising swapping locations of first and second leaf nodes in the tree structure of the first partition in response to a user command to swap in the first layout locations of a first user-selected one of the images in the first set corresponding to the first leaf node with a second user-selected one of the images in the first set corresponding to the second leaf node.

35. The machine of claim 32, wherein in the modifying the at least one data processing module is configured to perform operations comprising relocating a given leaf node in the tree structure of the first partition in response to a user command to move in the first layout a location of a user-selected one of the images in the first set corresponding to the given leaf node.

36. The machine of claim 32, wherein each leaf node is associated with a respective one of the nominal size values, and in the modifying the at least one data processing module is configured to perform operations comprising modifying a nominal size value associated with a respective one of the leaf nodes corresponding to a user-selected image in response to a user command to resize the user-selected image.

37. The machine of claim 32, wherein each leaf node is associated with a respective aspect ratio value defining a respective aspect ratio of a respective one of the images in the first set, and in the modifying the at least one data processing module is configured to perform operations comprising modifying an aspect ratio value associated with a respective one of the leaf nodes corresponding to a user-selected image in response to a user command to crop the user-selected image.

38. The machine of claim 26, wherein the at least one data processing module is configured to present the first layout of the first set of images in a pane of the user interface.

39. The machine of claim 38, wherein the user command specifies a location in the pane in which to insert a user-selected image and the at least one data processing module is configured to select the second partition that accommodates the image at the specified location and to indicate an area in the presentation of the first layout in the pane where the user-selected image is insertable in the first layout.

40. The machine of claim 38, wherein the at least one data processing module is configured to change sizes and positions of images in the presentation of the first layout in response to the user command.

41. A system for albuming images, comprising:
a computer-readable medium storing computer-readable instructions; and a data processing unit coupled to the memory, operable to execute the instructions, and based at least in part on the execution of the instructions operable to perform operations comprising
- automatically selecting a first partition of a page corresponding to a first layout of a first set of images on the page, wherein the first page partition is selected automatically from a first set of candidate page partitions based on scores that respectively are assigned to the candidate page partitions, each of the candidate page partitions corresponds to a different respective layout in accordance with which each of the images in the first set is positioned in a different respective non-overlapping location on the page, and each of the candidate pane partitions comprises a respective set of nominal size values defining respective nominal sizes of the images in the first set of images,
- on a display displaying a user interface that shows a graphical representation of the first layout of the first set of images and provides user controls enabling a user to modifying one or more of the images in the first layout in terms of size, shape, and position on the page,
- via the user interface, receiving at least one user command to modify a selected one of the images in the first layout in at least one of size, shape, and position on the page, and
- automatically selecting a second partition of the page corresponding to a second layout of a second set of images on the page in response to the user command, wherein the selecting of the second partition comprises modifying the first page partition.

42. At least one machine-readable medium storing machine-readable instructions that, when executed by a machine, cause the machine to perform operations comprising:
- automatically selecting a first partition of a page corresponding to a first layout of a first set of images on the page, wherein the first page partition is selected automatically from a first set of candidate page partitions based on scores that respectively are assigned to the candidate page partitions, each of the candidate page partitions corresponds to a different respective layout in accordance with which each of the images in the first set is positioned in a different respective non-overlapping location on the page, and each of the candidate page partitions comprises a respective set of nominal size values defining respective nominal sizes of the images in the first set of images;
- on a display displaying a user interface that shows a graphical representation of the first layout of the first set of images and provides user controls enabling a user to modify one or more of the images in the first layout in terms of size, shape, and position on the page;
- via the user interfaces receiving at least one user command to modify a selected one of the images in the first layout in at least one of size, shape, and position on the page; and
- automatically selecting a second partition of the page corresponding to a second layout of a second set of images on the page in response to the user command, wherein the selecting of the second partition comprises modifying the first pane partition.

* * * * *

UNITED STATES PATENT AND TRADEMARK OFFICE
CERTIFICATE OF CORRECTION

PATENT NO. : 7,656,543 B2
APPLICATION NO. : 10/987288
DATED : February 2, 2010
INVENTOR(S) : Clayton Brian Atkins Page 1 of 1

It is certified that error appears in the above-identified patent and that said Letters Patent is hereby corrected as shown below:

In column 16, line 4, in Claim 12, after "partition" delete "is".

In column 16, line 42, in Claim 19, delete "off" and insert -- of --, therefor.

In column 17, line 32, in Claim 26, delete "interfaces" and insert -- interface, --, therefor.

In column 17, line 49, in Claim 28, delete "user-elected" and insert -- user-selected --, therefor.

In column 18, line 2, in Claim 31, delete "images" and insert -- images, --, therefor.

In column 18, line 9, in Claim 32, before "comprises" delete "is".

In column 19, line 15, in Claim 41, delete "pane" and insert -- page --, therefor.

In column 19, line 21, in Claim 41, delete "modifying" and insert -- modify --, therefor.

In column 20, line 23, in Claim 42, delete "interfaces" and insert -- interface, --, therefor.

In column 20, line 31, in Claim 42, delete "pane" and insert -- page --, therefor.

Signed and Sealed this
Twenty-eighth Day of December, 2010

David J. Kappos
*Director of the United States Patent and Trademark Office*